(12) United States Patent
Lee (10) Patent No.: US 7,698,775 B2
(45) Date of Patent: Apr. 20, 2010

(54) WINDSHIELD WIPER ASSEMBLY HAVING A BODY MADE OF SPRING STEEL

(75) Inventor: Albert Lee, Baltimore, MD (US)

(73) Assignee: Alberee Products, Inc., Baltimore, MD (US)

( * ) Notice: Subject to any disclaimer, the term of this patent is extended or adjusted under 35 U.S.C. 154(b) by 0 days.

(21) Appl. No.: 11/976,701

(22) Filed: Oct. 26, 2007

(65) Prior Publication Data

US 2009/0106928 A1 Apr. 30, 2009

(51) Int. Cl.
*B60S 1/38* (2006.01)
(52) U.S. Cl. .............................. 15/250.201; 15/250.43; 15/250.451
(58) Field of Classification Search .............. 15/250.43, 15/250.201, 250.451, 250.452, 250.453, 15/250.454, 250.361, 250.44
See application file for complete search history.

(56) References Cited

U.S. PATENT DOCUMENTS

| | | | |
|---|---|---|---|
| 2,782,446 A * | 2/1957 | Krohm | 15/250.453 |
| 3,418,679 A | 12/1968 | Barth et al. | |
| D213,100 S | 1/1969 | Rickett | |
| 3,428,997 A | 2/1969 | Rickett | |
| 3,566,432 A | 3/1971 | Quinlan et al. | |
| 3,808,630 A | 5/1974 | Ito | |
| 3,919,736 A * | 11/1975 | Bourassa et al. | 15/250.452 |
| 4,722,112 A | 2/1988 | Schaub et al. | |
| 5,392,489 A | 2/1995 | Mohnach | |
| 5,493,750 A * | 2/1996 | Bollen et al. | 15/250.452 |
| 6,308,373 B1 | 10/2001 | Merkel et al. | |
| 6,523,218 B1 | 2/2003 | Kotlarski et al. | |
| 6,668,419 B1 | 12/2003 | Kotlarski | |
| 6,671,922 B1 | 1/2004 | Geilenkirchen et al. | |
| 7,007,339 B2 | 3/2006 | Weiler et al. | |
| 2003/0159229 A1 | 8/2003 | Weiler et al. | |
| 2004/0181894 A1 | 9/2004 | Lee et al. | |
| 2005/0172443 A1 | 8/2005 | Genet et al. | |
| 2006/0037167 A1 | 2/2006 | Nacamuli | |
| 2006/0156529 A1 | 7/2006 | Thomar et al. | |
| 2007/0061994 A1 | 3/2007 | Lee | |

FOREIGN PATENT DOCUMENTS

| | | | |
|---|---|---|---|
| DE | 100 00 372 A1 | | 8/2001 |
| DE | 10000372 | * | 8/2001 |
| DE | 100 14 803 A1 | | 10/2001 |

(Continued)

*Primary Examiner*—Gary K Graham
(74) *Attorney, Agent, or Firm*—Birch, Stewart, Kolasch & Birch, LLP (57) ABSTRACT

A windshield wiper assembly includes a pair of leaf spring elements supported generally parallel to each other with a space therebetween. Each of the leaf spring elements includes a longitudinal slot formed therein at opposite ends thereof. A support bracket maintains the pair of leaf spring elements in generally parallel spaced apart relation to support the squeegee therebetween. A pair of end caps is mounted on opposite ends of the pair of spring steel elements. Each of the end caps includes a pair of detents for engaging the longitudinal slots formed in the spring steel elements and a pair of slots for receiving the ends of the spring steel elements therethrough. A longitudinal length of each of the detents is shorter than a longitudinal length of the longitudinal slots formed in the spring steel elements, so that the spring steel elements can slide with respect to the end caps.

7 Claims, 12 Drawing Sheets

FOREIGN PATENT DOCUMENTS

| | | |
|---|---|---|
| DE | 101 11 757 A1 | 9/2002 |
| DE | 103 35 393 A1 | 9/2004 |
| DE | 202004012109 * | 11/2004 |
| GB | 2 106 775 A | 4/1983 |
| JP | 2007-176459 A | 7/2007 |

* cited by examiner

WINDSHIELD WIPER ASSEMBLY HAVING A BODY MADE OF SPRING STEEL

BACKGROUND OF THE INVENTION

1. Field of the Invention

The present invention relates to a windshield wiper assembly having a body made of spring steel. In particular, the present invention is directed to a windshield wiper assembly having a body made of spring steel that includes a bracket to secure a squeegee to the spring steel and an end cap to hole the windshield wiper assembly together.

2. Description of Related Art

Various types of windshield wiper assemblies having a body made of spring steel are known. For example, one windshield wiper assembly uses two parallel pieces of spring steel to secure a squeegee therebetween. The two pieces of spring steel are spot welded together in spaced apart relationship with a portion of the squeegee being located between the two pieces of spring steel. Although this background art windshield wiper assembly eliminates the necessity of having multiple frame elements to make up the body of the windshield wiper assembly, the spot welding prevents easy replacement of the squeegee.

Another background art windshield wiper assembly uses two pieces of spring steel that hold a squeegee therebetween. An end cap is used to hold the two pieces of spring steel in position to hold the squeegee. Although this background art windshield wiper assembly also eliminates the necessity of having multiple frame elements, the end cap does not maintain the two pieces of spring steel sufficiently away from each other to allow for the squeegee to move longitudinally between the two pieces of spring steel. In view of this, binding of the squeegee during operation of the windshield wiper assembly occurs.

SUMMARY OF THE INVENTION

Accordingly, it is an object of the present invention to provide a windshield wiper assembly, which eliminates the above problems encountered with windshield wiper assemblies according to the background art.

The above objects are accomplished by a windshield wiper assembly, comprising:

a pair of leaf spring elements, said leaf spring elements being supported generally parallel to each other with a space therebetween, each of said leaf spring elements including a longitudinal slot formed therein at opposite ends thereof;

a squeegee, said squeegee being supported within the space between the leaf spring elements;

a windshield wiper arm bracket, said windshield wiper arm bracket being fixed to an intermediate portion of said pair of spring steel elements and being connectable to a windshield wiper arm;

a support bracket, said support bracket maintaining said pair of leaf spring elements in generally parallel spaced apart relation to support said squeegee therebetween, said support bracket supporting said squeegee for longitudinal movement with respect to said pair of leaf spring elements during operation of the windshield wiper assembly to prevent binding of said squeegee; and a pair of end caps mounted on opposite ends of said pair of spring steel elements, each of said end caps including a pair of detents for engaging the longitudinal slots formed in the spring steel elements and a pair of slots for receiving the ends of the spring steel elements therethrough, wherein a longitudinal length of each of the detents is shorter than a longitudinal length of the longitudinal slots formed in the spring steel elements, so that the spring steel elements can slide with respect to the end caps.

Further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Referring now in detail to the accompanying drawings, the preferred embodiments of the present invention will be described. Referring to FIGS. 1-12, a first embodiment of the present invention will be described.

A windshield wiper assembly 1 includes a squeegee 3 supported between two spring steel elements 5 (leaf spring elements). A windshield wiper arm bracket 7 is mounted to the outside of the spring steel elements 5 (See FIGS. 1 and 2). The windshield wiper arm bracket 7 would include an adapter (not shown) attached thereto by a post 9, so that the windshield wiper arm bracket 7 can be removably connected to a windshield wiper arm (not shown).

Figures 1, 2, 3, 4:
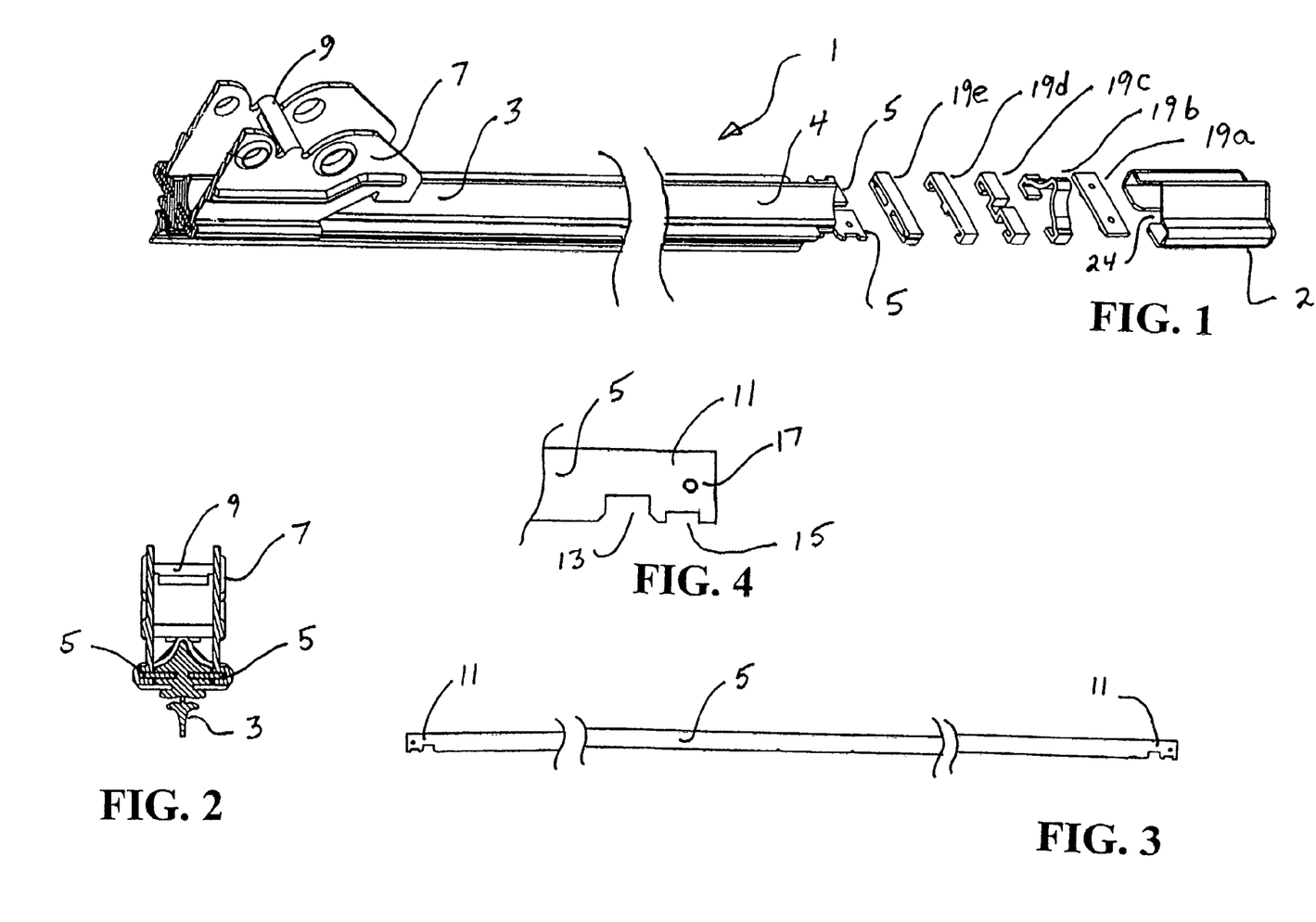
FIG. 1 is a partial perspective view of a windshield wiper assembly according to a first embodiment of the present invention.
FIG. 2 is a cross-sectional view of FIG. 1 through the windshield wiper arm bracket.
FIG. 3 is a partial top view of one of spring steel elements according to the first embodiment of the present invention.
FIG. 4 is a detail view of FIG. 3.

The spring steel elements 5 will now be further described with reference to FIGS. 3 and 4. As should be understood, two spring steel elements 5 are included in the windshield wiper assembly 1 of the present invention. However, since each of the two spring steel elements 5 is a mirror image of each other, only one will be specifically described. Referring to FIG. 3, the spring steel element 5 includes two end portions 11. Each of the end portions includes a first cut-out 13 and a second cut-out 15 (see FIG. 4). In addition, each of the end portions includes a hole 17 extending therethrough.

The spring steel elements 5 are arranged in spaced apart relationship to secure the squeegee 3 therebetween. However, it is advantageous to allow the squeegee to slide longitudinally with respect to the spring steel elements 5 during operation of the windshield wiper assembly 1. If the squeegee 3 is securely clamped between the spring steel elements 5, so that the squeegee 3 cannot slide, the squeegee will bind and therefore affect the proper operation of the windshield wiper assembly 1. In addition, the squeegee 3 should be allowed to slide with respect to the spring steel elements, so that the squeegee 3 can be replaced without difficulty.

It should be noted that the recitation "spring steel elements" is not limited to elements that are made of steel. As long as the material is functional as a leaf spring, then such material would be considered within the scope of the present invention. For example, other types of metal or plastics could also be used as the spring steel elements 5.

In order to secure the squeegee 3 between the spring steel elements 5 in the above manner, one of the brackets 19a, 19b, 19c, 19d or 19e are used. The brackets 19a-19e will be individually described below with reference to FIGS. 6-10. In addition to the brackets 19a-19e, an end cap 21 is secured to each end of the two spring steel elements 5. The end caps 21 prevent the squeegee 3 from moving longitudinally more than a predetermined amount during operation of the windshield wiper assembly 1. Removal of one of the end caps 21 will gain access to the brackets 19a-19e, which can be removed to replace the squeegee 3.

Figure 5:
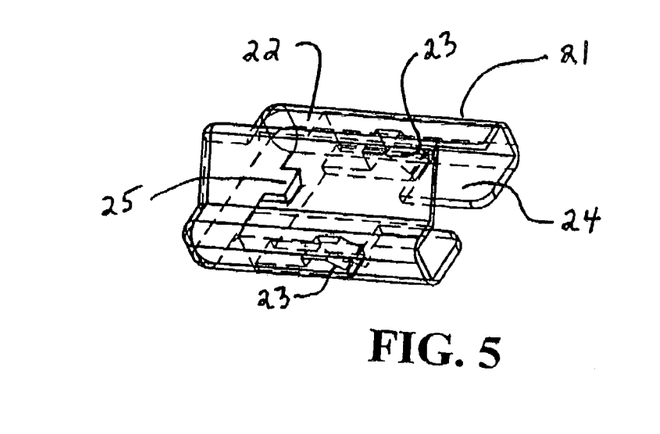
FIG. 5 is a perspective view of an embodiment of the bracket according to the first embodiment of the present invention.

Referring to FIGS. 1, 4 and 5, the operation of the end cap 21 will be described. The end cap 21 is secured over the brackets 19a-19e, the spring steel elements 5 and the squeegee 3. The end cap includes a body 22 that forms a space 24 for receiving the brackets 19a-19e, the spring steel elements 5 and the squeegee 3. The body 22 includes two detents 23 that extend into the space 24 and are received in a respective one of the first cut-outs 13 of the two spring steel elements 5. The detents are elastically deformable, so that they can be moved out of engagement with the first cut-outs 13 to remove the end cap 21 from the spring steel elements 5. However, in the relaxed state, the two detents are secured in the first cut-outs 13 to attach the end cap 21 to the spring steel elements.

Referring to FIG. 5, the end cap 21 can include a tab 25 that is received between the adjacent spring steel elements 5. The tabs are designed such that the spring steel elements are separated from each other by a predetermined distance that allows the squeegee 3 to slide longitudinally with respect to the spring steel elements 5 during operation of the windshield wiper assembly 1 to prevent binding of the squeegee 3. This structure enables proper operation of the windshield wiper assembly 1. The end cap 21 also includes a top portion 27 that is structured to correspond to the shape of the spoiler 4 formed integrally with the squeegee 3. If the squeegee 3 does not include a spoiler 4, then the end cap 21 can be constructed to have a top portion 27 that corresponds to the shape of the squeegee 3 and/or brackets 19a-19e.

Figure 6:
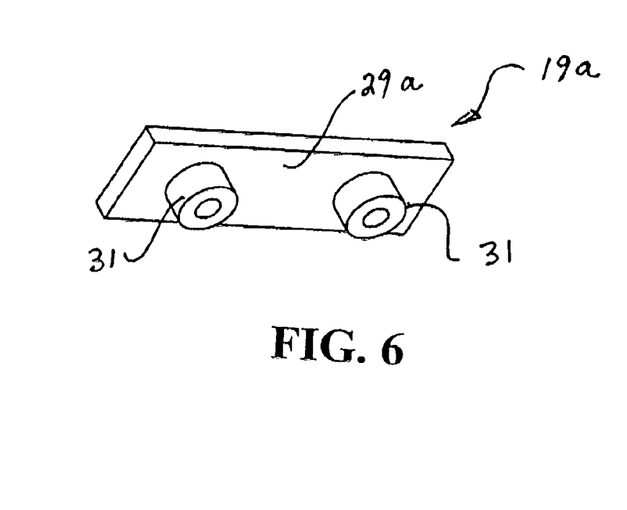
FIG. 6 is a perspective view of an embodiment of the bracket according to the first embodiment of the present invention.

Referring to FIG. 6, one embodiment of the bracket according to the present invention will be described. It should be understood that only one of the brackets 19a-19e is included in a particular windshield wiper assembly 1. It should also be understood that opposite ends of the windshield wiper assembly 1 could include different of the brackets 19a-19e attached thereto. The bracket 19a includes a body 29a having two bosses 31 extending from one surface thereof. The bosses 31 are received within the holes 17 of the two spring steel elements 5. The bosses 31 can then be connected to the spring steel elements by a removable fastener. Alternatively, the bosses 31 can be deformed like a rivet to secure the bracket 19a to the spring steel elements. The bosses 31 are designed so that the spring steel elements 5 are spaced away from each other to prevent binding of the squeegee 3 located therebetween.

The bracket 19a can be used on one end of the windshield wiper assembly 1 or on both ends of the windshield wiper assembly 1. If used on both ends; however, it is difficult to replace the squeegee 3 when necessary, if the bosses 31 are deformed as described above. In such a case, the bracket 19a should only be used on one end of the windshield wiper assembly, with the opposite end of the windshield wiper assembly utilizing one of the brackets 19a-19e, which are more easily removable.

Figure 7:
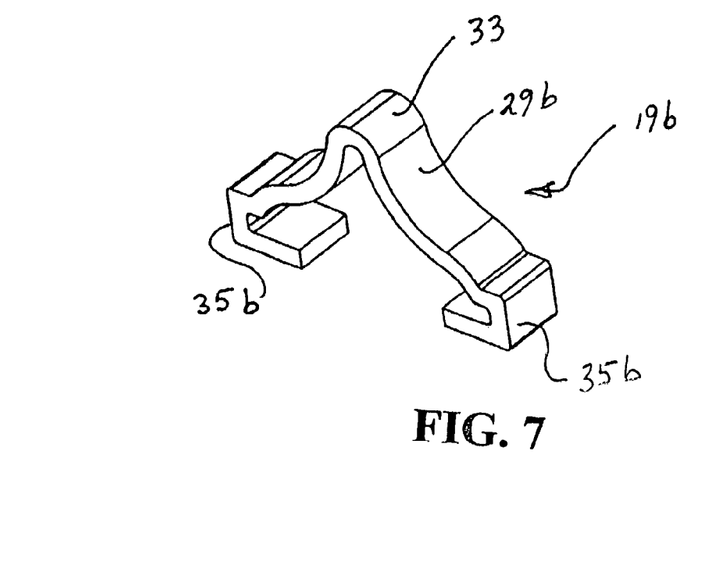
FIG. 7 is a perspective view of an embodiment of the bracket according to the first embodiment of the present invention.

Referring to FIG. 7, a bracket 19b includes a body 29b having a top portion 33 that corresponds to the shape of the spoiler 4 on the squeegee 3. The bracket 19b is typically used along with an end cap 21 that includes a tab 25 to maintain the spring steel elements 5 in a properly separated state. The resiliency of the bracket 19b also assists in maintaining the separation between the two spring steel elements 5. The bracket 19b includes two arms 35b that are received in the second cut-outs 15 of the two spring steel elements 5. Therefore, the spring steel elements can secure the squeegee 3 therebetween, so that the squeegee 3 does not bind during operation of the windshield wiper assembly 1.

Although not required, the bracket 19b is preferably crimped to the spring steel elements 5 to permanently mount the bracket 19b to the spring steel elements 5. Crimping the bracket 19b to the spring steel elements provides the advantage of maintaining the windshield wiper assembly 1 together if the end cap 21 is accidentally removed. However, as mentioned above, the top portion 33 of the body 29b includes a shape that corresponds to the shape of the spoiler 4 on the squeegee. In view of this, even though the bracket 19b is crimped to the spring steel elements 5, the squeegee can be removed by simply removing the end cap 21. In other words, the top portion 33 of the bracket 19b enables the squeegee 3 to be removed without removing the bracket 19b by sliding the squeegee 3 through the space formed by the top portion 33 of the bracket 19b and the spring steel elements 5.

Figure 8:
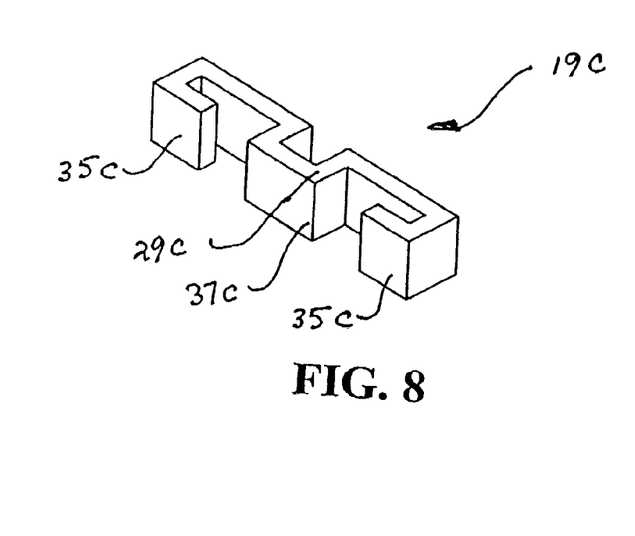
FIG. 8 is a perspective view of an embodiment of the bracket according to the first embodiment of the present invention.
Figure 9:
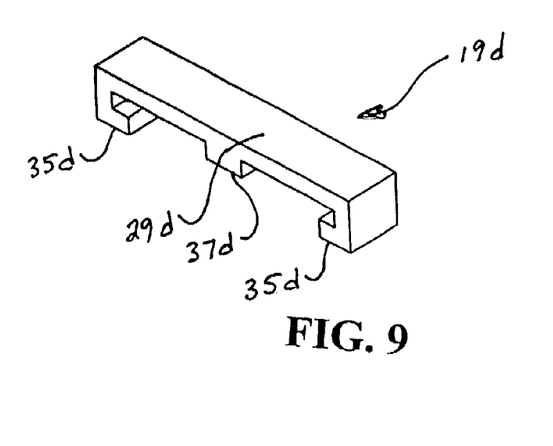
FIG. 9 is a perspective view of an embodiment of the bracket according to the first embodiment of the present invention.
Figure 10:
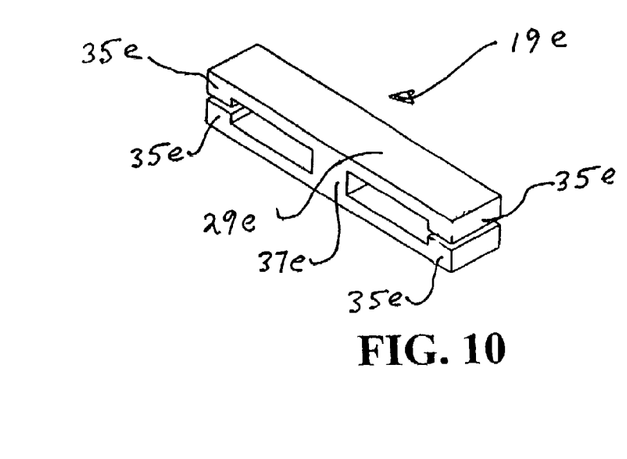
FIG. 10 is a perspective view of an embodiment of the bracket according to the first embodiment of the present invention.

Referring to FIGS. 8-10, the brackets 19c-19e will be described. Each of the brackets 19c-19e includes a body 29c, 29d and 29e, respectively. In addition, arms 35c, 35d and 35e are respectively included on the body 29c, 29d and 29e. The arms 35c-35e are received in the second cut-outs 15 formed in the two spring steel elements 5. The arms 35c-35e secure the spring steel elements 5 together with the squeegee 3 located therebetween. In addition, the brackets 19c-19e include tabs 37c, 37d and 37e, respectively. The tabs 37c-37e are received in the space between the two spring steel elements 5, so that the squeegee 3 is properly mounted therebetween.

It should be noted that the tab 37e of the bracket 19e is actually a rib, since it extends between two surfaces of the body 19e. However, the term "tab" is considered to encompass the rib of the bracket 19e.

Figure 11:
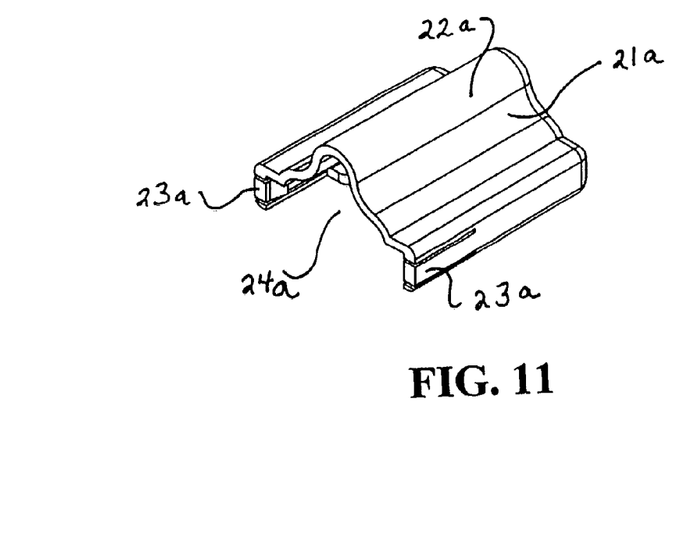
FIG. 11 is a perspective view of an embodiment of the bracket according to the first embodiment of the present invention.
Figure 12:
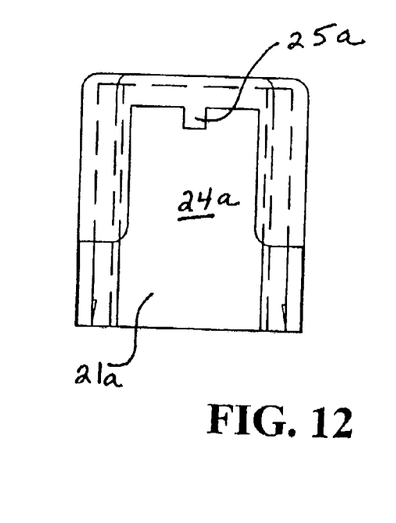
FIG. 12 is a bottom view of FIG. 11.

Referring to FIGS. 11 and 12, an alternative arrangement of the end cap 21 will be described. The end cap 21a includes a pair of detents 23a that are received in the first cut-outs 13 of the spring steel elements 5. The detents 23a are mounted to the side wall of the end cap 21a instead of a bottom wall as in the end cap 21 of the first embodiment. Therefore, the detents 23a pivot into the cut-outs 13 from a side of the spring steel elements 5, rather than from a bottom of the spring steel elements 5. In addition, the end cap 21a can include a tab 25a that extends between the two spring steel elements 5 to maintain the spring steel elements 5 in a separated state. The operation of the end cap 21a is similar to the operation of the end cap 21. Therefore, the operation of the end cap 21a will not be described further.

A second embodiment of the present invention will now be described with reference to FIGS. 13-18. In FIGS. 13-18, the same reference numerals have been used to identify the same or similar elements, except that 100 has been added to the reference numeral when the element is not identical to the corresponding element in the first embodiment. In view of this, only the differences between the first and second embodiments will be further described. It should be noted that the elements in the first embodiment can easily be substituted for the elements in the second embodiment.

Figure 13:
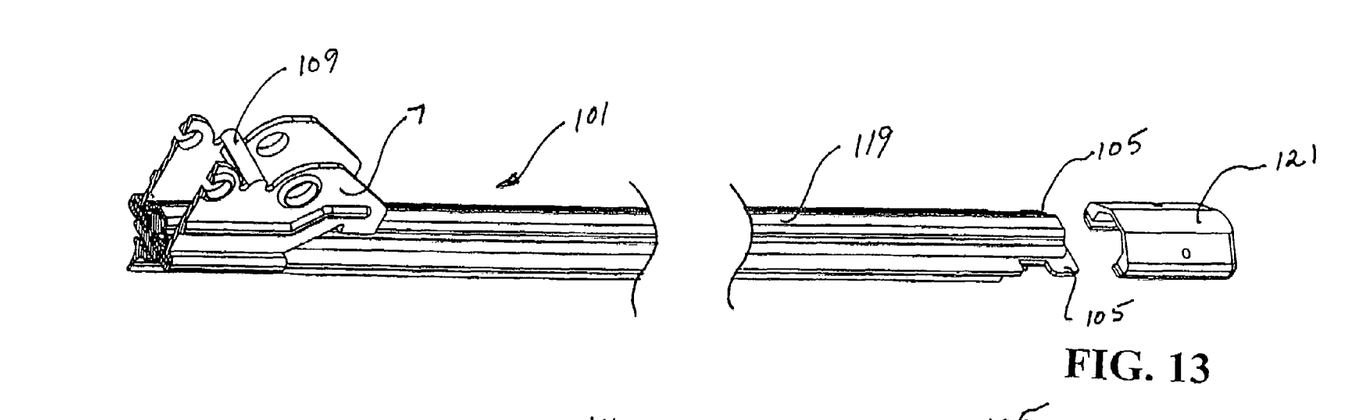
FIG. 13 is a partial perspective view of a windshield wiper assembly according to a second embodiment of the present invention.

In FIG. 13, the squeegee 103 does not include a spoiler thereon as in the first embodiment of the present invention. However, it should be understood that the second embodiment is not limited to a squeegee without a spoiler. The squeegee of the first embodiment could also be used in the second embodiment of the present invention.

Figures 14, 15, 16:
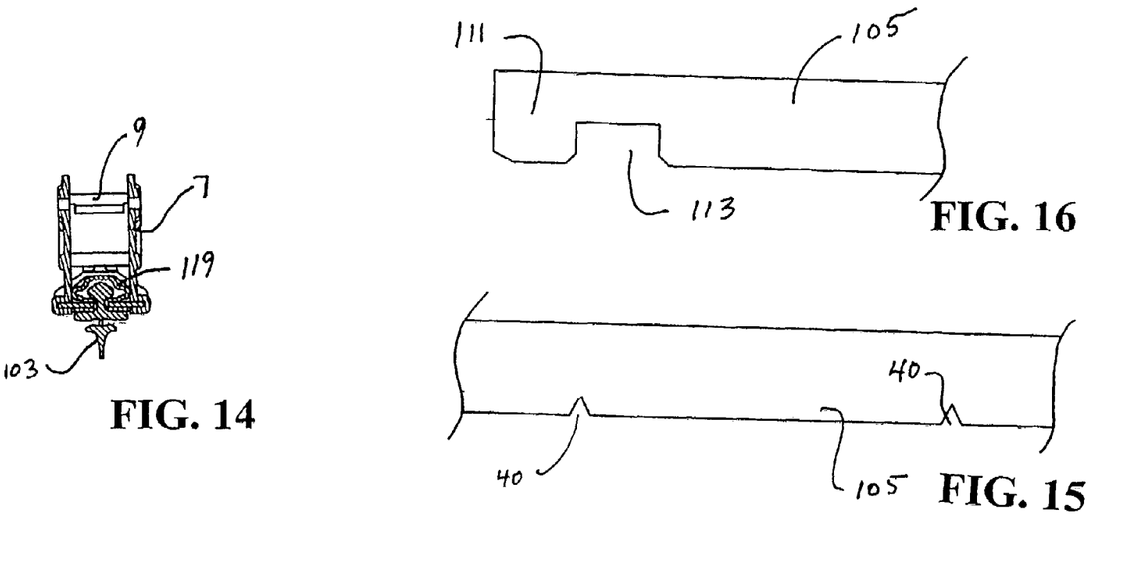
FIG. 14 is a cross-sectional view of FIG. 13 through the windshield wiper arm bracket.
FIG. 15 is a detail view of a center portion of one of the spring steel elements according to the second embodiment of the present invention.
FIG. 16 is a detail view of an end portion of one of the spring steel elements according to the second embodiment of the present invention.

Referring to FIGS. 13 and 14 of the present invention, the windshield wiper assembly 101 includes two spring steel elements 105 arranged in the same manner described in the first embodiment to support the squeegee 103 therebetween. However, instead of using one of the brackets 19a-19e to maintain the spring steel elements 105 in proper spaced relationship, a bracket 119 is used instead. The bracket 119 will be described below with reference to FIG. 18.

Referring to FIGS. 15 and 16, the spring steel elements 105 will be described. The end portions 111 of the spring steel elements are similar to the end portions 11 of the first embodiment, except that a single cut-out 113 is formed in each of the end portions 111. The cut-out 113 receives detents 123 (see FIG. 17) in the manner described above with regard to the end cap 21 of the first embodiment.

It should be noted that an end cap similar to the end cap 21a illustrated in FIG. 11 of the first embodiment (or the end cap 21) could also be used instead of the end cap 121. All that is necessary is to have a pair of detents for cooperating with the cut-outs 113 formed in the spring steel elements 105. It should also be noted that the same spring steel elements 5 of the first embodiment that include two cut-outs 13 and 15 and a hole 17 could also be used in the second embodiment. However, only one of the pair of cut-outs would be used to attach the end cap 121 (or end cap 21 or 21a) to the windshield wiper assembly 101.

Figure 17:
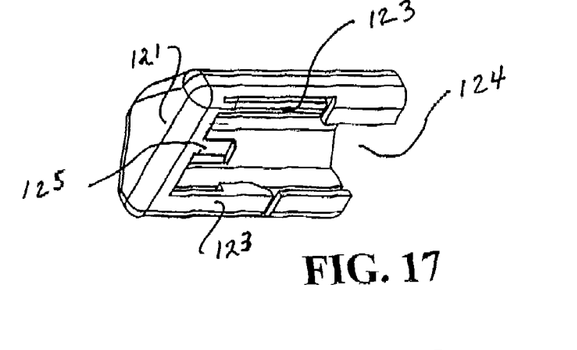
FIG. 17 is a perspective view of the end bracket according to the second embodiment of the present invention.

Referring to FIG. 17, the end cap 121 can also include a tab 125 that is received between the pair of spring steel elements 105. The tab 125 will maintain the spring steel elements 105 is spaced apart relation, so that the squeegee therebetween will not bind in operation as described above with regard to the first embodiment of the present invention. It should be noted; however, that the tab 125 is not required, since the bracket 119 may be sufficient to maintain the spacing between the two spring steel elements 105.

Figure 18:
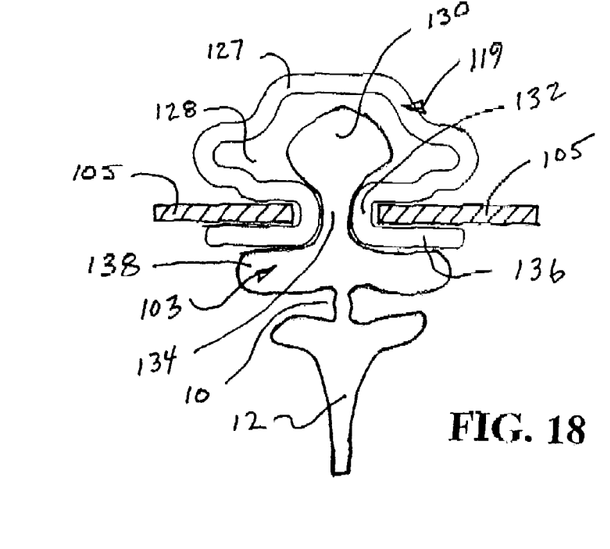
FIG. 18 is an explanatory view of the support element according to the second embodiment of the present invention.

Referring to FIG. 18, the bracket 119 will be described. FIG. 18 is an explanatory partial cross-section of the windshield wiper assembly 101 of the second embodiment. The bracket 119 includes an upper portion 127 that defines a space 128 therein. The shape of the upper portion 127 and space 128 should generally correspond to the shape of an upper portion 130 of the squeegee 103. Further to this, it should be noted that the bracket 119 can be constructed to be used with any type of squeegee, as long as the squeegee includes an upper portion that can be received within the space 128.

The bracket 119 also includes an intermediate portion 132 that receives an intermediate portion of the squeegee 103. Furthermore, the bracket 119 includes a lower portion 136 that receives a lower portion 138 of the squeegee 103. As can be understood from FIGS. 13 and 14, the bracket extends from one end of the windshield wiper assembly 101 to the other, generally along the entire length of the squeegee 103. The intermediate portion 132 is constructed so that the spacing between the spring steel elements 105 enables the squeegee 103 to longitudinally slide with respect to the spring steel elements 105 (and/or the bracket 119). In other words, the bracket is made of a rigid material, for example a rigid plastic, so that the spacing between the two spring steel elements 105 is maintained. In addition, the space between opposite sides of the intermediate portion 132 of the bracket 119 (the space formed by the intermediate portion 132 that receives the intermediate portion 134 of the squeegee 103), can be constructed to enable the squeegee to move longitudinally with respect to the bracket 119 during operation of the windshield wiper assembly 101. In addition, the squeegee 103 can be easily replaced by simply removing the end cap 121 and sliding the squeegee out of the bracket 119.

Figure 19:
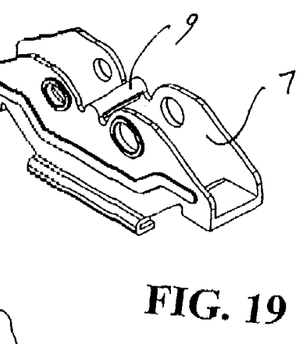
FIG. 19 is a perspective view of the windshield wiper arm bracket according to the present invention.

Referring to FIG. 19, the bracket 7 is illustrated in perspective view. The bracket 7 is mounted to the spring steel elements 5, 105 by cut-outs 40 (see FIGS. 3 and 15). The bracket 7 would include tabs (not shown) that would be received inside the cut-outs 40, to attach the bracket 7 to the spring steel elements 5, 105.

Figure 20:
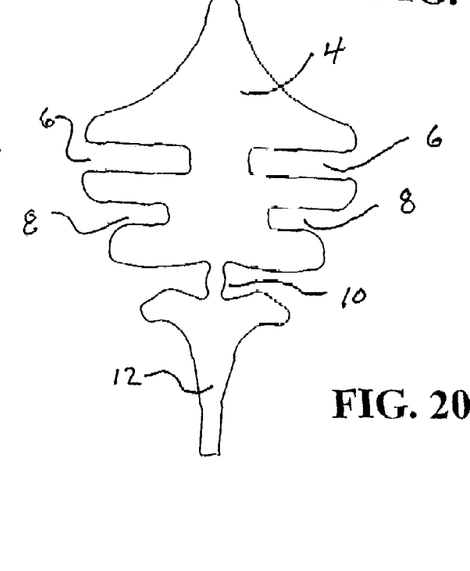
FIG. 20 is a cross-sectional detail view of a squeegee having an air spoiler formed integrally thereon.

Referring to FIG. 20, a cross-section of the squeegee 3 will be further described. The squeegee includes the spoiler 4, cut-outs 6 that receive the spring steel elements 105 and cut-outs 8 that receive the bracket 7. In addition, a hinge portion 10 supports the blade 12 to the supported portions of the squeegee 3. The hinge portion 10 can be made rounded as illustrated in FIGS. 18 and 20 to increase the performance of the blade 12 during operation of the windshield wiper assembly 1, 101.

Figures 21A, 22A, 23A, 24A:
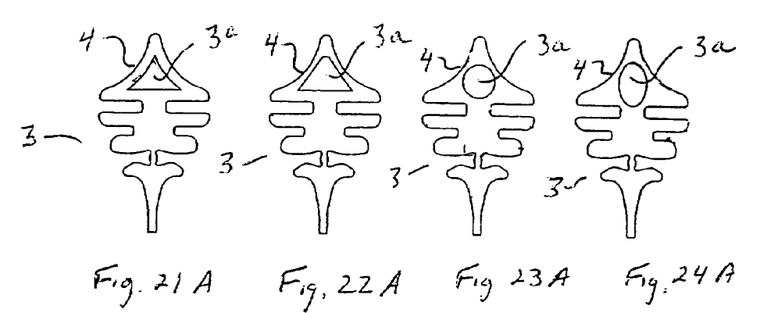
FIGS. 21A to 21D are views of a second embodiment of the squeegee of the present invention.
FIGS. 22A to 22D are views of a third embodiment of the squeegee of the present invention.
FIGS. 23A to 23D are views of a fourth embodiment of the squeegee of the present invention.
FIGS. 24A to 24D are views of a fifth embodiment of the squeegee of the present invention.
Figures 21B, 22B, 23B, 24B:
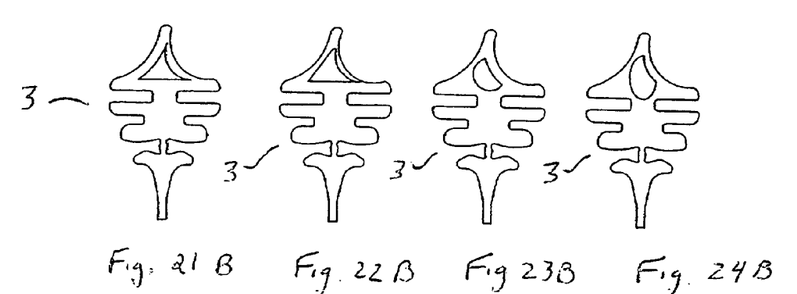
Figures 21C, 21D, 22C, 22D, 23C, 23D, 24C, 24D:
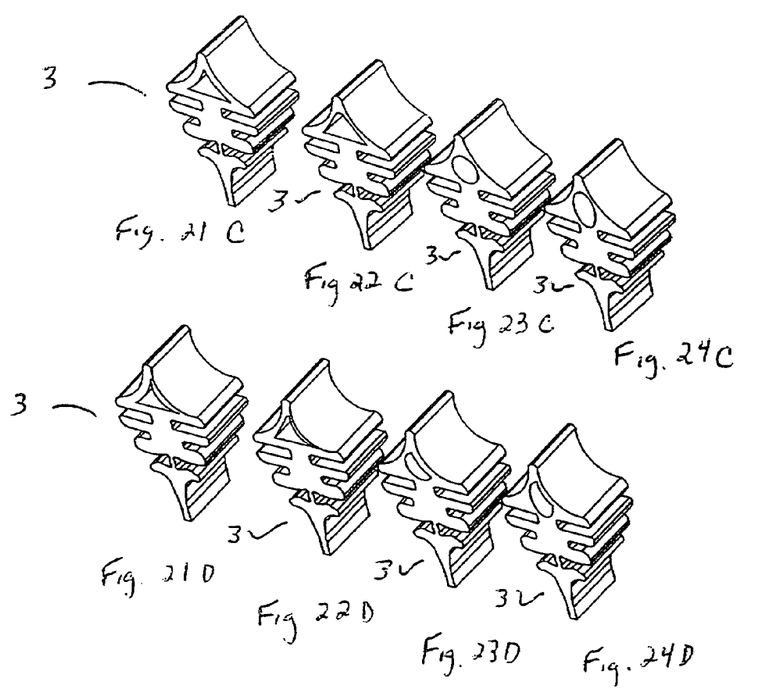
Figure 25A:
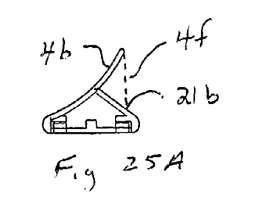
FIGS. 25A to 25I are views of a third embodiment of the end cap of the present invention.
Figure 25B:
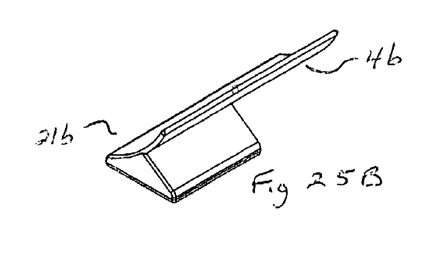
Figure 25C:
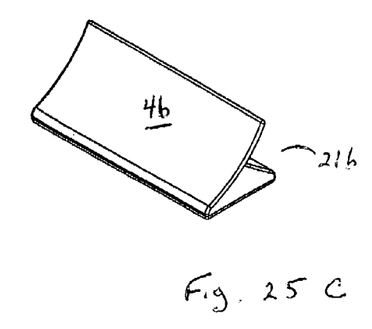
Figures 25D, 25H:
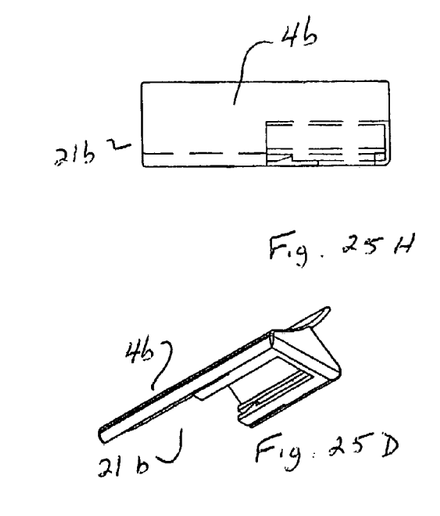
Figure 25E:
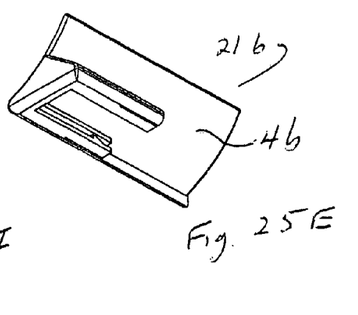
Figure 25F:
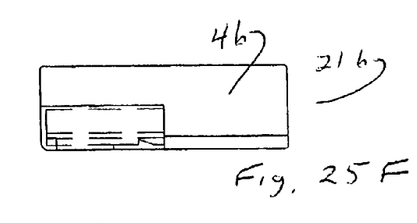
Figure 25G:
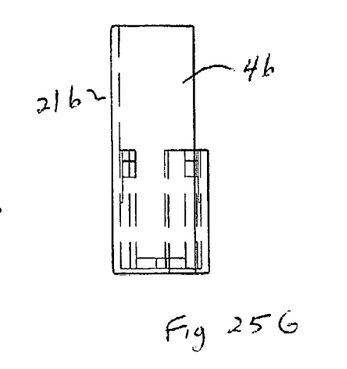
Figure 25I:
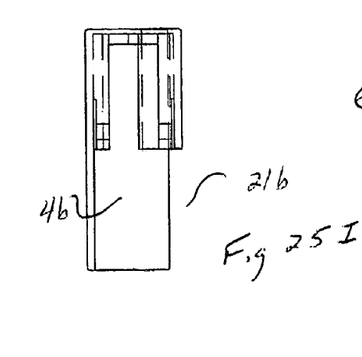

Referring to FIGS. 21A to 21D, a second embodiment of the squeegee 3 according to the present invention is illustrated. In FIGS. 21A and 21B, the squeegee 3 is illustrated in cross-section, while in FIGS. 21C and 21D, the squeegee 3 is illustrated in perspective. The views of FIGS. 21A and 21C illustrate the squeegee 3 when not subjected to the wind generated by, for example, movement of a vehicle. FIGS. 21B and 21D illustrate the squeegee 3 when subjected to the force of the wind. In the second embodiment of the squeegee 3, a hole 3a is formed throughout generally the entire length of the spoiler 4. The hole 3a enables the spoiler 4 to flex (See FIGS. 21B and 21C) more than the squeegee according to the first embodiment (See FIG. 20). The flexing of the spoiler 4 provides more turbulence on the side of the spoiler 4 that is opposite to the source of wind, thereby increasing the downward force that the spoiler 4 causes to the squeegee 3 to maintain better contact of the squeegee with a windshield of a vehicle. This turbulence forms a low-pressure zone due to a vortex formed on the side of the squeegee opposite to the source of wind.

Referring to FIGS. 22A to 22D, 23A to 23D and 24A to 24D, third through fifth embodiments of the squeegee 3 of the present invention are illustrated. These embodiments are the same as the second embodiment illustrated in FIGS. 21A to 21D; however, the shape of the hole 3a in the spoiler 4 has a different shape. It should be understood that the shape of the hole 3a can also take other forms that would be within the scope of the present invention. The hole 3a is provided to increase the flexibility of the spoiler 4. Therefore, as long as the hole increases the flexibility to a sufficient extent, such a squeegee 3 would be within the scope of the present invention.

Figure 29:
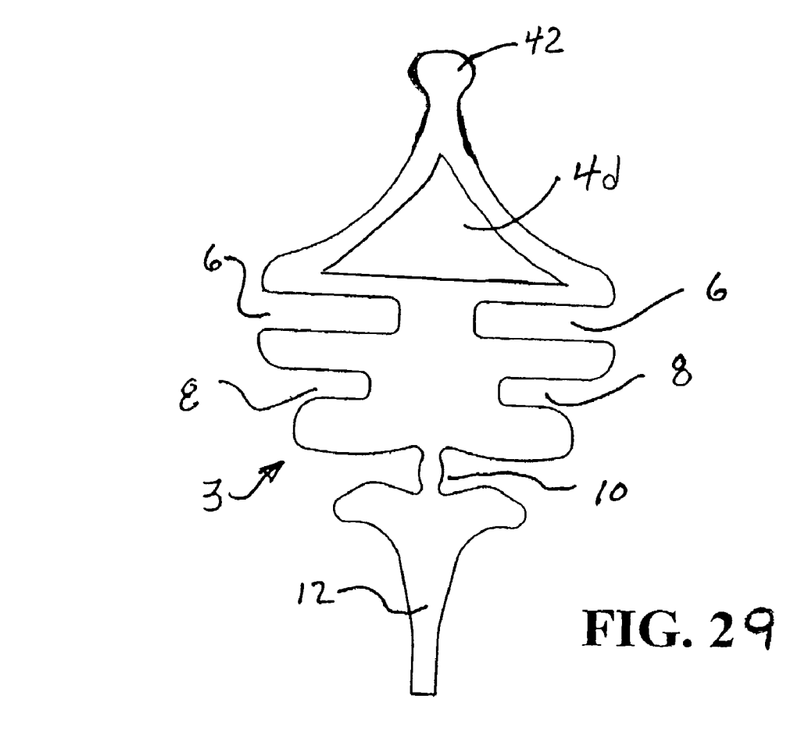
FIG. 29 is a view of an alternative arrangement of the squeegee of FIG. 20.

It should be noted at this time that each of the spoilers 4 illustrated in the first through fifth embodiments of the squeegee 3 of the present invention can also include a ball shaped protrusion on a tip thereof. The ball shaped protrusion further increases the low pressure zone on the side of the spoiler 4 that is opposite to the source of the wind. Therefore, the squeegee is further held on the windshield of a vehicle. FIG. 26C (to be described further below) illustrates a ball shaped protuberance 42 formed on a spoiler 4c. The same type of ball shaped protuberance 42 could also be formed on the spoiler 4 of the first through fifth embodiments of the squeegee 3 of the present invention. For example, FIG. 29 illustrates a squeegee 3 having a ball shaped protuberance 42 and a hole 4d.

Referring to FIGS. 25A through 25I of the present invention, an alternative arrangement of the end cap of the present invention will be described. The end cap 21b in FIGS. 25A through 25F are the same as the end cap 21 illustrated in FIGS. 1 and 5; however, the end cap 21b includes a spoiler 4b formed on a top thereof. The spoiler 4b further increases the low pressure zone behind the spoiler to thereby further maintain the squeegee 3 on a windshield of a vehicle.

It should be noted that the end cap 21b can be used with the embodiment of FIG. 1 or with the embodiment of FIG. 13 in order to increase the low pressure zone behind the spoiler. In addition, the end cap 21b can include a wall 4e (illustrated in dashed lines in FIG. 25A) extending vertically down from an apex of the spoiler 4b to the base of the end cap. In other words, a back side of the spoiler is closed in to eliminate the hollow back side of the spoiler 4b. The wall 4e changes the location of the low pressure zone to assist in holding the squeegee to a windshield.

Figure 26A:
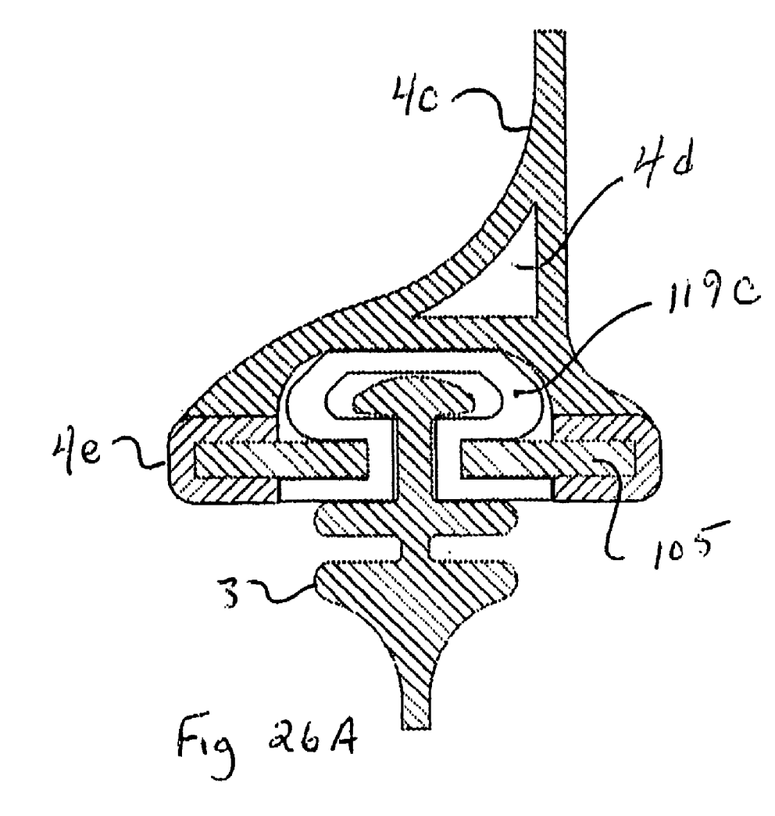
FIGS. 26A through 26C are views of embodiments of the present invention that include a spoiler attached to a bracket in the embodiment of FIG. 18.
Figure 26B:
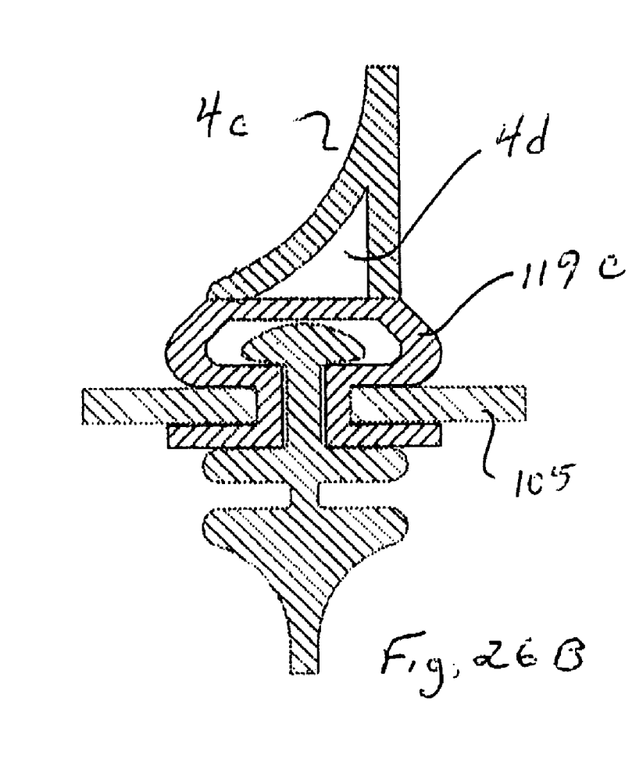
Figure 26C:
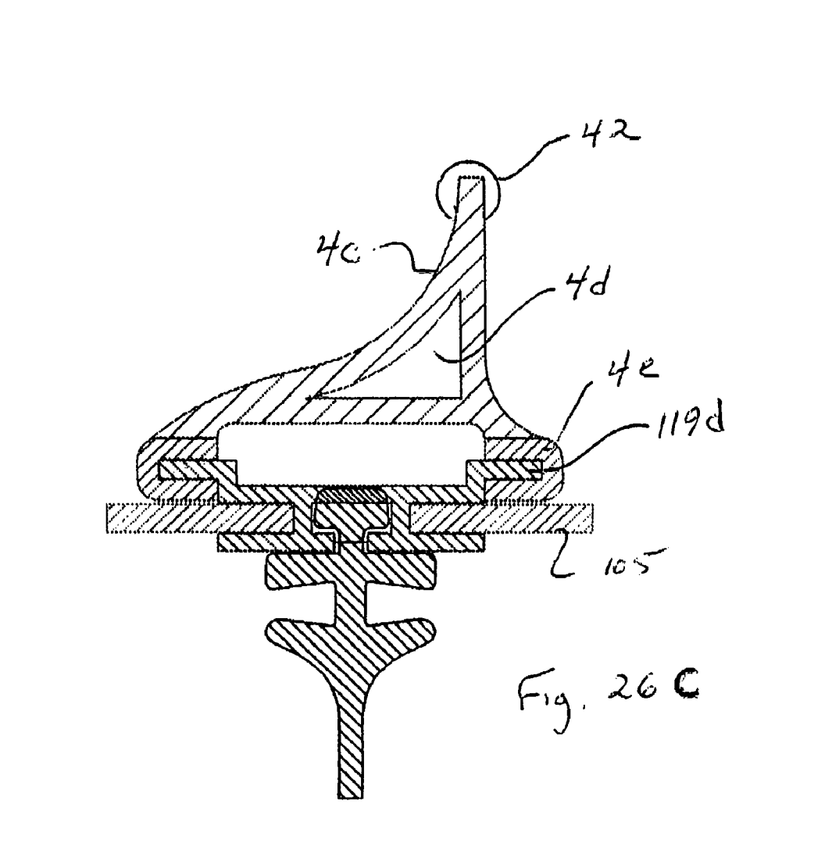
Figure 26D:
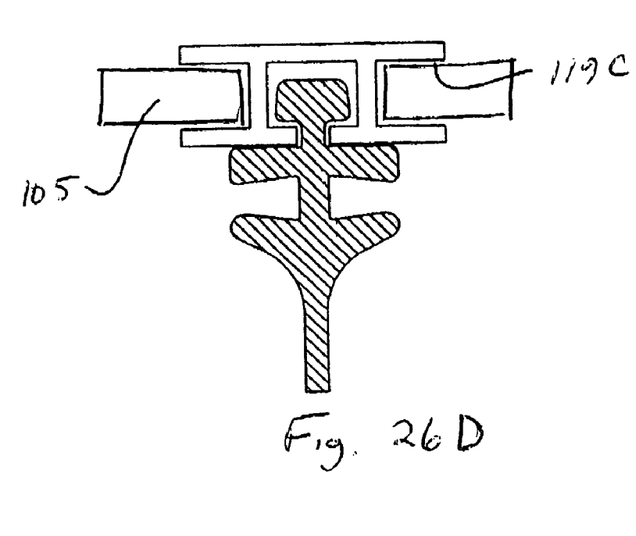
FIG. 26D is a view of an alternative arrangement of the bracket in the embodiment of FIG. 18.

Referring to FIGS. 26A through 26D, an alternative arrangement of the bracket 119 of FIG. 13 is illustrated. FIGS. 26A to 26C illustrate several different ways to add a spoiler 4c to a bracket 119c. FIG. 26D illustrates an alternative bracket 119c.

Referring to FIG. 26A, a bracket 119c is generally the same as the bracket 119 in FIG. 18. However, the top of the bracket 119c is vertically compressed. In addition, a spoiler 4c is attached to the outside of the spring steel elements 105. The spoiler 4c can include a hole 4d therethrough. The spoiler 4c is constructed of a flexible rubber material similar to the material of the squeegee 3. Therefore, the hole 4d enables further flexing of the spoiler 4c in the same manner described above with regard to the spoiler 4 formed on the squeegee 3 of the second to fifth embodiments of the squeegee. The spoiler 4c in FIG. 26A includes a base 4e of rigid plastic that is integrally molded with the spoiler 4c. The base 4e has sufficient rigidity to mount the spoiler 4c to the spring steel 105.

Referring to FIG. 26B, a second embodiment of the spoiler 4c is illustrated. In the second embodiment, the bracket 119c includes the spoiler 4c mounted to a top thereof, rather than the spoiler 4c being mounted to the spring steel elements 105.

Referring to FIG. 26C, a third embodiment of the spoiler 4c is illustrated. In the third embodiment, the bracket 119d has a more rectilinear shape. The spoiler 4c is mounted directly to the bracket 119d as in the second embodiment. The spoiler 4c of the third embodiment includes a rigid base 4e as in the first embodiment, except the rigid base 4e attaches to the bracket 119d instead of the spring steel elements 105.

In FIG. 26C, a ball shaped protuberance 42 is illustrated on the tip of the spoiler 4c. Although not required, the ball shaped protuberance 42 further increases the low pressure zone on the back side of the spoiler 4c to increase the holding force of the squeegee 3 on a windshield of a vehicle. The protuberance 42 could also be used on the spoilers 4c of FIGS. 26A and 26B in order to increase the holding force of the squeegee by forming a vortex that increases the low pressure zone on the side of the squeegee opposite to the source of wind.

Referring to FIG. 26D, a bracket 119c is rectilinear as in the third embodiment illustrated in FIG. 26C. However, the bracket 119c of FIG. 26D does not include a connecting portion for a spoiler. The embodiment of FIG. 26D can be used as an alternative to the bracket 119 of FIG. 18. As can be understood, the bracket 119c of FIG. 26D has a lower profile than the bracket 119. In addition, the top of the squeegee is located between the spring steel elements 105, instead of above.

Figure 27:
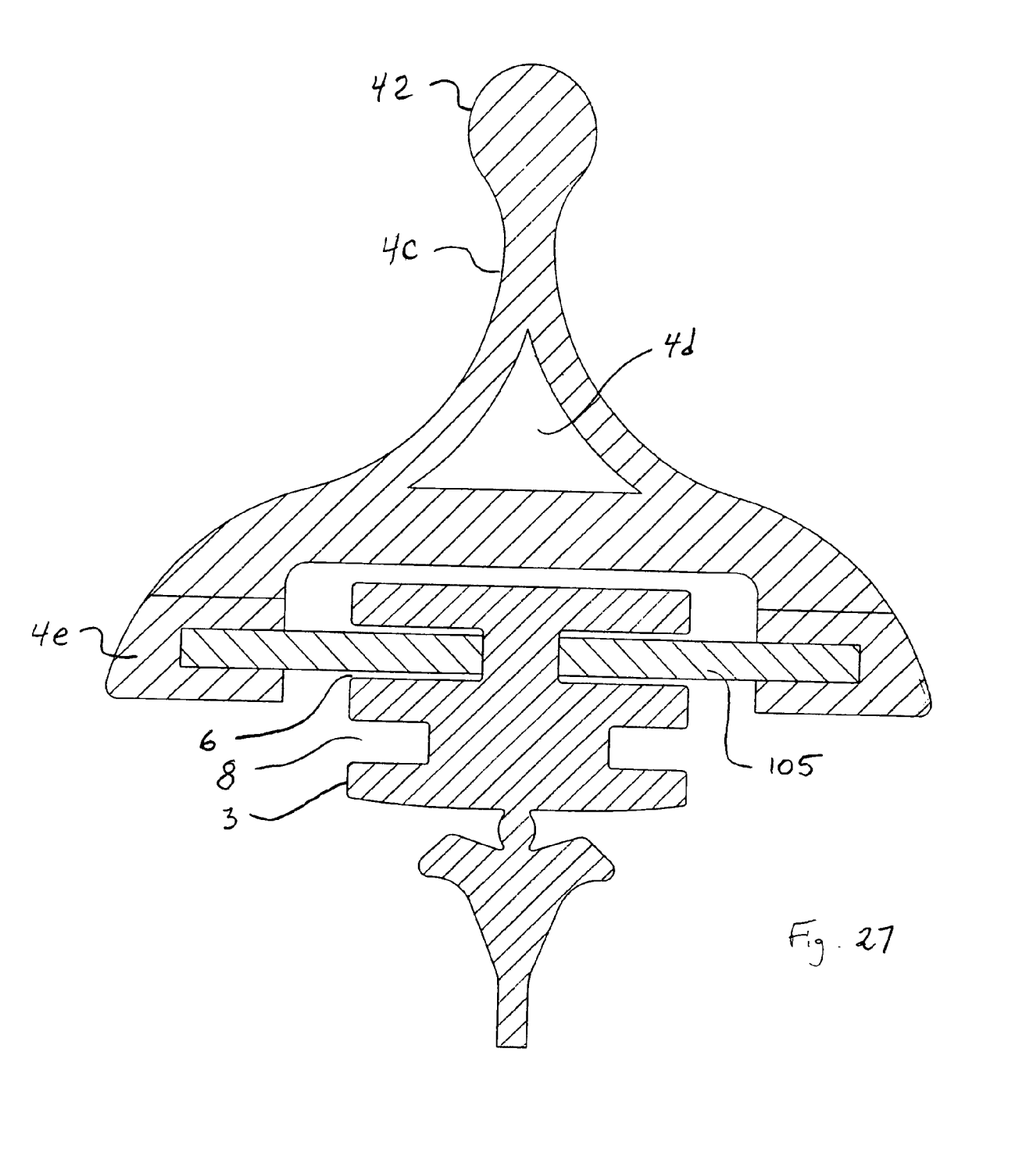
FIGS. 27 and 28 are views of an alternative arrangements of the spoiler of the present invention.
Figure 28:
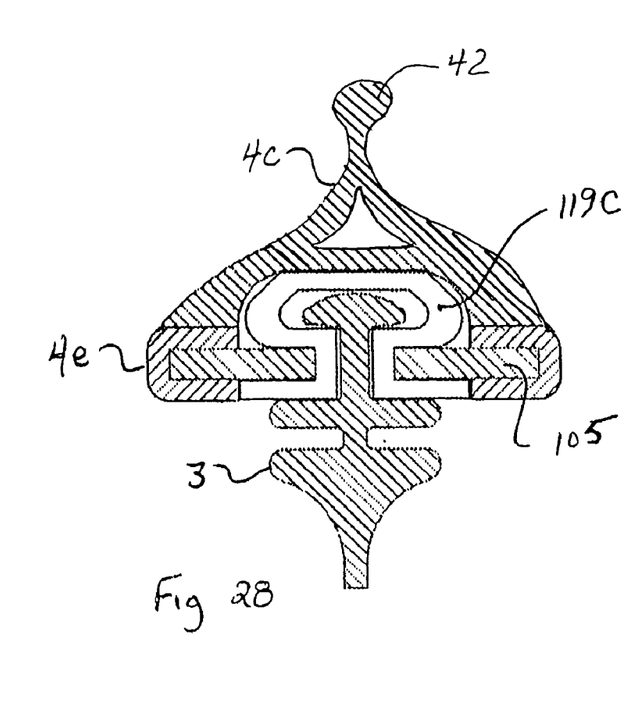

Referring to FIGS. 27 and 28, further embodiments of the spoiler of the present invention are illustrated. The embodiments of FIGS. 27 and 28 are similar to the embodiments of FIGS. 26A-26C, which illustrate the spoiler 4c of the present invention. However, in the embodiment of FIG. 27, there is no bracket element, and in FIGS. 27 and 28, the spoiler is centered and includes a ball shaped protrusion on a top thereof. The embodiments of FIGS. 26 and 27 will be described in turn.

Referring to FIG. 27 a squeegee 3 includes cut-outs 6 that receive the spring steel elements 105 and cut-outs 8 that receive the bracket 7. In addition, a hinge portion 10 can be made rounded as illustrated in FIGS. 18 and 20 to increase the performance of the blade 12 during operation of the windshield wiper assembly 1, 101. However, instead of having a spoiler 4 as in FIG. 20 that is integrally formed with the squeegee 3, the embodiment of FIG. 27 includes a separate spoiler 4c that is similar to the spoiler 4c of FIG. 26A.

Specifically, the spoiler 4c is constructed of flexible rubber material and includes a hole 4d formed therethrough. In addition, a base 4e of rigid plastic is integrally molded with the spoiler 4c. Finally, the spoiler 4c of FIG. 27 includes a ball shaped protuberance 42 formed on a top thereof. The ball shaped protuberance 42 is centered with a longitudinal center line of the squeegee, and the hole 4d is centered with the ball shaped protuberance 42. The ball shaped protuberance 42 also increases the holding force of the squeegee by forming a vortex that increases the low pressure zone on the side of the squeegee opposite to the source of wind as explained above.

Referring to FIG. 28, this embodiment is the same as the embodiment of FIG. 26A, including the bracket 119C. However, the embodiment of FIG. 28 includes a ball shaped protuberance 42 and a hole 4d that is centered with respect to the longitudinal axis of the squeegee 3.

Figure 30:
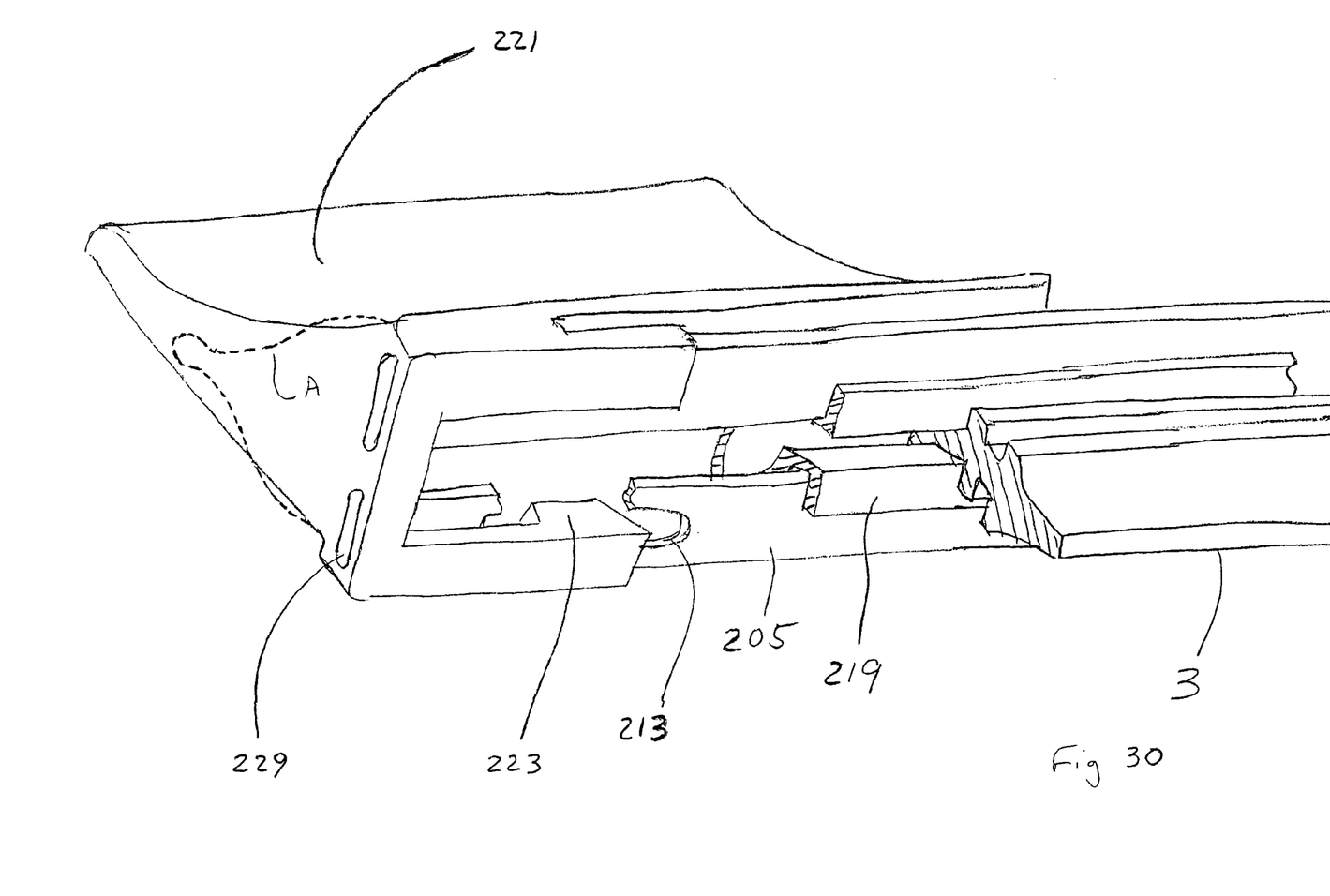
FIG. 30 is an alternative arrangement of the spoiler end cap of the present invention.

Referring to FIG. 30, an alternative embodiment of the end cap of the windshield wiper assembly of the present invention is illustrated. It should be noted that this alternative embodiment can be used with any of the previously mentioned embodiments. For example, the bracket 219 can be eliminated and an arrangement such as that illustrated in FIG. 27 or FIG. 29 could be used with the end cap of FIG. 30. Also, the bracket 219 can be included, and an arrangement such as that illustrated in FIG. 28 could be used with the end cap of FIG. 30. Of course, if the end cap of FIG. 30 is used with the spoiler 4c of FIG. 27 or 28 or with the squeegee 3 of FIG. 29, it would be necessary for the end cap of FIG. 30 to have a cross-sectional shape that corresponds to the cross-sectional shape of the spoiler or squeegee, respectively. Such a cross-sectional shape is identified by reference character A in FIG. 30, which identifies a dashed line.

Referring to FIG. 30, a spoiler end cap 221 includes detents 223 that engage slots 213 that are formed in the spring steel elements 205. In addition, the spoiler end cap 221 includes slots 229 formed therein for receiving the spring steel elements 205 therethrough. In the embodiment of FIG. 30, a squeegee 3 that is used with a bracket 219 is illustrated. However, as mentioned above, the spoiler end cap 221 of FIG. 30 could be used with other arrangements as well.

It should be noted that the spring steel elements 205 can be manufactured very easily when compared to the spring steel elements 5 of FIG. 4. This is because the spring steel elements 205 include only the slots 213 formed therein at opposite ends thereof. The cut-outs 13 and 15 and the hole 17 in the spring steel elements 5 of FIG. 4 are not necessary in the spring steel elements 205 of FIG. 30.

The slots 229 in the spring steel elements 205 allow the detents 223 of the spoiler end cap 221 to slide therein. In addition, the slots 229 allow the spring steel elements 205 to slide therethrough. This prevents the spring steel elements 205 from separating and prevents any binding pressure from occurring between the two spring steel elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield wiper assembly, comprising:
a pair of spring steel elements, said spring steel elements being supported generally parallel to each other with a space therebetween, each of said spring steel elements including a longitudinal slot formed therein at opposite ends thereof;
a squeegee, said squeegee being supported within the space between the spring steel elements;
a windshield wiper arm bracket, said windshield wiper arm bracket being fixed to an intermediate portion of said pair of spring steel elements and being connectable to a windshield wiper arm;
a support bracket having a main body that extends across the pair of spring steel elements in a direction perpendicular to a length of the pair of steel elements, said support bracket maintaining said pair of spring steel elements in generally parallel spaced apart relation to support said squeegee therebetween, said support bracket supporting said squeegee for longitudinal movement with respect to said pair of spring steel elements during operation of the windshield wiper assembly to prevent binding of said squeegee; and
a pair of end caps mounted on opposite ends of said pair of spring steel elements, each of said end caps including a pair of detents for engaging the longitudinal slots formed in the spring steel elements and a pair of slots for receiving the ends of the spring steel elements therethrough,
wherein a longitudinal length of each of the detents is shorter than a longitudinal length of the longitudinal slots formed in the spring steel elements, so that the spring steel elements can slide with respect to the end caps,
wherein the longitudinal slot is a cut-out that is exposed on one side thereof, and
wherein each of said spring steel elements further includes another longitudinal slot formed therein at opposite ends thereof, and the another longitudinal slot is another cut-out that is exposed on one side thereof.

2. The windshield wiper assembly according to claim 1, further comprising a spoiler mounted on a top of the spring steel elements.

3. The windshield wiper assembly according to claim 2, wherein the spoiler includes a main body portion, said main body portion including a ball shaped protuberance formed on a top portion thereof, said ball shaped protuberance being generally centered with a longitudinal axis of the windshield wiper assembly.

4. The windshield wiper assembly according to claim 3, wherein the main body portion includes a hole extending therethrough along generally an entire length thereof.

5. The windshield wiper assembly according to claim 4, wherein said spoiler is formed integral with the squeegee.

6. The windshield wiper assembly according to claim 3, wherein said spoiler is formed integral with the squeegee.

7. The windshield wiper assembly according to claim 1, wherein the support bracket further includes two arms, each of said arms being received in corresponding another longitudinal slots of each of said spring steel elements.

* * * * *